UNITED STATES PATENT OFFICE.

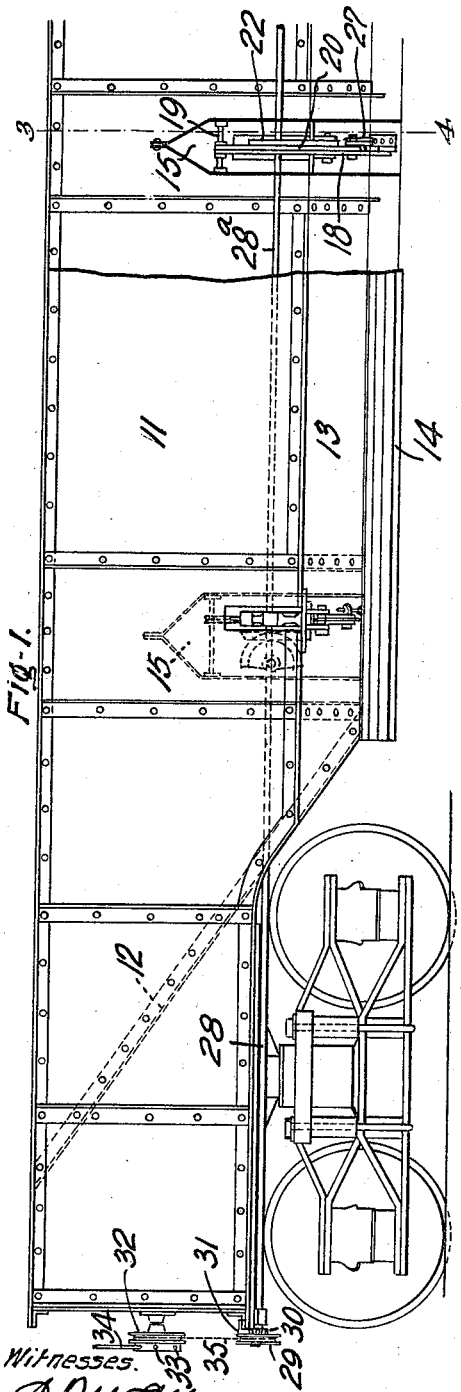
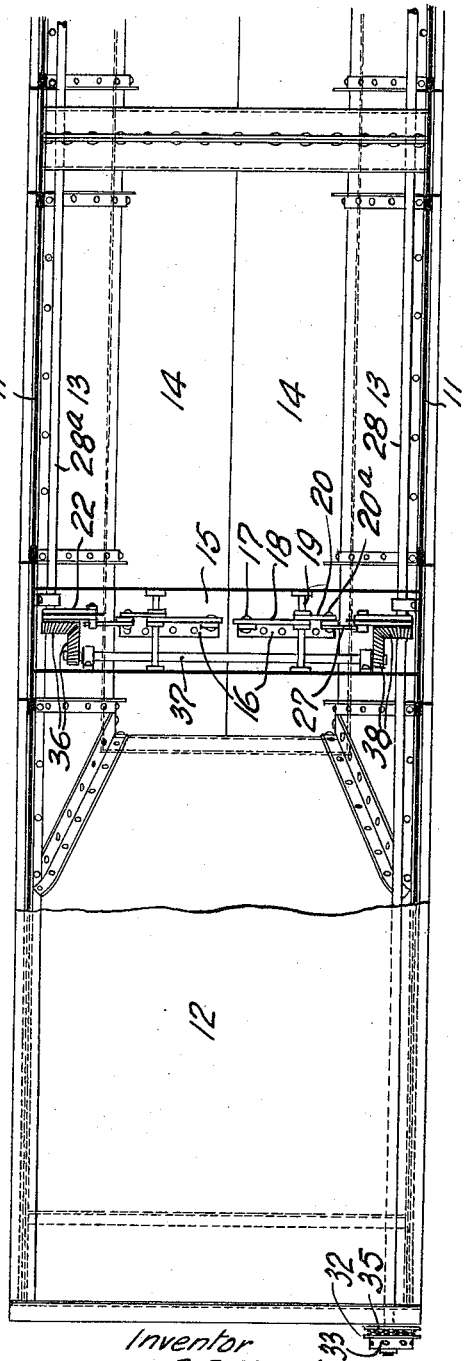

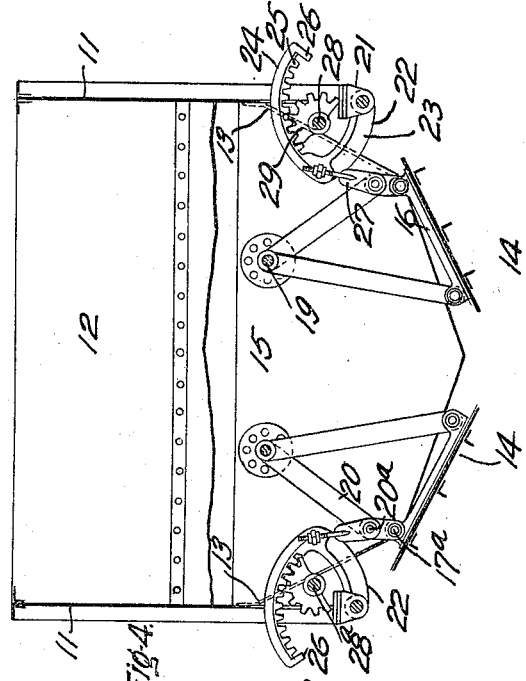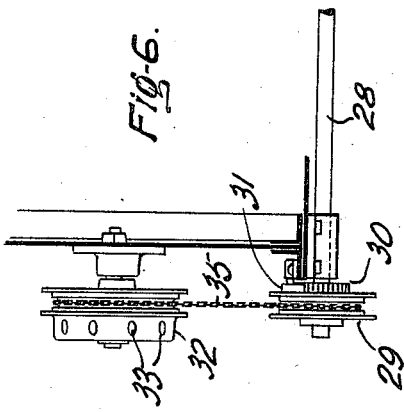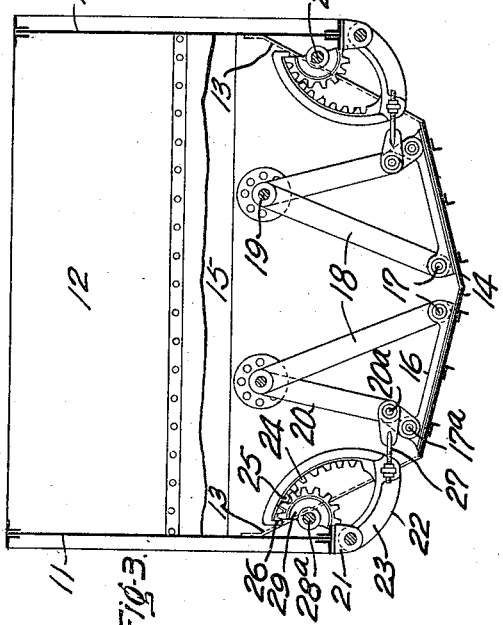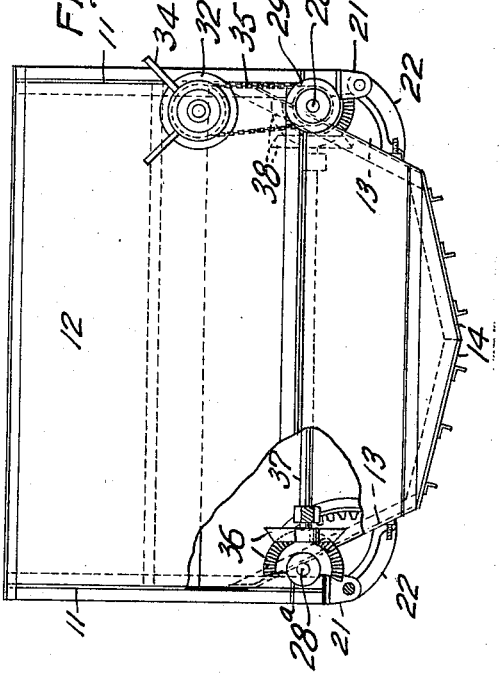

ALLISON R. CHAMBERS, OF NEW GLASGOW, NOVA SCOTIA, CANADA.

CAR-DOOR-OPERATING MEANS.

1,179,609.

Specification of Letters Patent. Patented Apr. 18, 1916.

Application filed June 20, 1914. Serial No. 846,299.

*To all whom it may concern:*

Be it known that I, ALLISON R. CHAMBERS, of New Glasgow, in the Province of Nova Scotia and Dominion of Canada, a subject of the King of Great Britain, have invented new and useful Improvements in Car-Door-Operating Means, of which the following is a full, clear, and exact description.
This invention relates to improvements in car door operating means, and is particularly designed for use in connection with the type of car shown in my former application, Ser. No. 784,250, but may be used on any other car of suitable construction.

The object of the invention is to provide means for operating the bottom floor doors of cars.

A further object is to provide means for moving a floor door bodily in a lateral direction, whereby a car may be provided with a very low hanging hopper bottom.

A still further object is to provide means for breaking the doors away from the contents of the car prior to the opening, if the doors have become frozen to the load during cold wet weather.

The invention consists essentially in providing hangers for the floor doors pivoted to the car a considerable distance above and between the inner and outer longitudinal edges of the door, so that the door will move as nearly as possible in a horizontal direction. The suspension means of the doors includes a toggle mechanism adapted to force the doors away from the car body and load therein. Suitable rack and pinion mechanism is provided for moving the doors and operating the toggle mechanism.
In the drawings which illustrate the invention:—Figure 1 is a side elevation of a car such as described in my former application, showing the operating means in position thereon. Fig. 2 is a plan view partly in section. Figs. 3 and 4 are cross sections on the line 3—4, Fig. 1, showing the doors in closed and open positions, respectively. Fig. 5 is an end elevation of the car partly broken away. Fig. 6 is an enlarged side elevation of the actuating means for the door mechanism.

Referring more particularly to the drawings, 11 designates a car body having sloping ends 12 and floor plates 13 forming a hopper bottom, which is closed by doors 14. At the ends of the hopper bottom and at suitable intermediate points, transverse pockets 15 are provided for the reception of the door operating mechanism.

The doors 14, which meet at the longitudinal center of the car, may extend from end to end thereof in one piece or may be divided at the center or other points as desired. Under each pocket 15, the doors are provided with fixed transverse members 16, having at the ends thereof pivots, 17, 17ª. From the inner edge of the door, a link 18 extends from the pivot 17 to a pivot 19 mounted near the top of the pocket and between the vertical planes containing the inner and outer edges of the door. From the pivot 19, a two part link 20 extends to the pivot 17ª, the two parts of this link being connected by a pivot 20ª, so that the link becomes in effect a toggle lever.

Opposite each pocket, a bracket 21 is secured to the side of the car and carries a rack member 22 formed of two angularly arranged arms 23 and 24, curving toward one end, the free end of the former arm being pivoted to the bracket 21 and the latter arm being provided on its inner edge with teeth 25 and at its extremity with a hook 26. The member is connected at its apex or junction of the two arms by means of an adjustable link 27 with the pivot 20ª of the toggle link 20. Shafts 28, 28ª are arranged longitudinally of the car, one on each side thereof, and carry gear sectors 29 which mesh with the teeth 25 of the rack member. The shaft 28 extends a short distance beyond the end sill of the car, and is provided at its extremity with a fixed chain pulley 29 and toothed wheel 30, which may be engaged by a reversible ratchet 31. Fixed to the end of the car a short distance above the chain wheel 29 is a second chain wheel 32 having radial apertures 33 therein for the insertion of a lever 24 to rotate the same. The wheels 29 and 32 are connected by an endless chain 35. The other shaft 28ª is much shorter, terminating for example in the end pocket 15, and is connected by miter gears 36 with a cross shaft 37, which is in turn connected by miter gears 38 with the shaft 28, so that rotation of the shaft 28 will produce simultaneous rotation of the shaft 28ª.

The operation of the device is extremely simple. The operator first throws the ratchet 31 into the desired position, and then places the lever 34 in a convenient opening of the wheel 32 and gives the wheel a partial revolution shifting the bar to a fresh opening and imparts a further partial revolution. This is communicated by the chain to the shaft 28, and from the shaft 28 through the cross shaft 37 to the shaft 28ᵃ, so that both operate simultaneously. The shafts rotate the fixed gear sectors 29, which move the rack members 22. In the opening movements of the doors, the first movement of the rack is transmitted through the link 27 to the toggle links 20 supporting the outer edges of the doors. These links straighten out and thereby slightly lock, forcing the outer edges of the door away from the floor plates of the car. If the load has become caked or frozen in the car, the door is thus broken away from the load and is free to move. Continued revolution of the shafts or the weight of the material draws the doors laterally to the position shown in Fig. 4, the doors swing from the pivots 19 so that the movement is lateral and slightly upward, whereby in the maximum open position the lowest portion of the door is only very slightly lower than the lowest point in closed position. The doors are, however, held at a greater incline, and as the tension of lifting the doors has again shortened the toggle links 20, the doors are jammed tightly against the lower edges of the floor plates, as clearly shown and form a continuation thereof, so that the load will be discharged along the center line of the car. According as the movement of the shaft 28 is for opening or closing the doors, the ratchet 31 is thrown to one side or the other to hold the shaft against revolution in a reverse direction, while the bar is being shifted from one pole to another. In closing the doors, it is only necessary to lift the pawl 31 as the doors will close of their own weight, a partial revolution of the shaft being imparted to jam them tightly together and shorten the toggle links. The hooks 26 on the ends of the racks prevent disengagement of the racks and gear sectors, while the use of an adjustable link 27 enables all parts of the mechanism to be adjusted for absolutely uniform operation.

The obvious advantage of using the low hanging hopper bottom is that the center of gravity of the car is considerably lowered, and also the discharge is more easily limited to an area within the rails, so that the car does not block the track in unloading.

While one particular form of operating gear has been shown, it is obvious that a number of changes may be made without departing from the spirit of the invention. For example, the shafts 28, 28ᵃ and also the floor doors may be divided at the center of the car, and four operating gears provided so that the four doors may be operated independently, or the cross shaft 37 may be duplicated at the opposite end of the car and the shafts and doors divided, so that each end of the car may be unloaded separately. As the pockets form divisions in the car, this might be a very advantageous arrangement permitting one car to carry two kinds of material, for example, sand in one end and stone in the other. Also, the exact form of actuating gear on the end of the shaft 28 may be varied, for example, by providing the radially apertured drum directly on the shaft or by substituting the well known ratchet hub lever, or by placing it on the side of the car and attached to shaft 37 instead of 28. It is obvious, moreover, that the divided link 20 may if desired be replaced by a solid link similar to the link 18.

Having thus described my invention, what I claim is:—

1. In a car, the combination with side and floor plates and doors, of pockets arranged transversely of the car, door supporting means in said pockets, and rack and pinion mechanism for shifting said doors.

2. In a car, the combination with side and floor plates and doors, of pockets arranged transversely of the car, door supporting arms pivoted in said pockets, and rack and pinion mechanism operatively connected to said doors.

3. In a car, the combination with a body and its floor doors, of pockets arranged transversely of the car, door supporting arms pivoted in said pockets, operating shafts extending longitudinally of the car, rack members pivotally mounted on the car and operatively connected to said door supporting arms, and pinions on the longitudinal shafts engaging said rack members.

4. In a car, the combination with a body and its floor doors, of pockets arranged transversely of the car, door supporting arms pivoted in the pockets, rack members pivotally connected to the car, adjustable links pivotally connecting said racks with the door supporting arms, and gears mounted on the longitudinal shafts engaging said racks.

5. In a car, the combination with a body and its floor doors, of pockets arranged transversely of the car, door supporting arms pivoted in said pockets and pivotally connected to the doors, certain of said arms being divided to form toggle levers, and door operating mechanism connected to said toggle arms.

6. In a car, the combination with a body and its floor doors, of transverse plates arranged in pairs between the body sides and forming pockets, a pair of arms pivoted at their lower extremities to each door and at a common point between said transverse plates, one of said arms being divided to form a toggle mechanism, and door shifting means connected to said toggle arm.

7. In a car, the combination with a body and its floor doors, of transverse plates arranged in pairs between the body sides and forming pockets, an arm pivoted at its lower extremity adjacent the inner edge of each door, an arm pivoted at its lower extremity adjacent the outer edge of each door, a pivot carried by said transverse plates above and between the inner and outer edges of said door, supporting the upper extremities of said arms, the arm attached to the outer edge of the door being divided to form a toggle mechanism, and door shifting means connected to said toggle mechanism.

8. In a car, the combination with a body and its floor doors, of transverse plates arranged in pairs between the body sides and forming pockets, an arm pivoted at its lower extremity adjacent the inner edge of each door, an arm pivoted at its lower extremity adjacent the outer edge of each door, a pivot carried by said transverse plates above and between the inner and outer edges of said door, supporting the upper extremities of said arms, one of said arms being divided to form a toggle mechanism, a longitudinal shaft, and rack and pinion mechanism operated by the shaft connected to said toggle arm.

9. In a car, the combination with a body and its floor doors, of transverse plates extending between the car sides and forming pockets, door supporting arms arranged in pairs, the arms of each pair being divided at a common point, a longitudinal shaft at each side of the car, means connecting said shafts across the car for simultaneous operation, rack and pinion mechanism connecting the shafts with one arm of each pair, and rotating means mounted at the end of one of said shafts.

10. In a car, the combination with a body and its floor doors, of transverse pockets, means in said pockets supporting the doors for lateral movement, said means including mechanism for forcing the door away from the car prior to lateral movement.

11. In a car, the combination with a body and its floor doors, of transverse pockets, door supporting means pivoted in said pockets including toggle mechanism arranged to force the doors away from the contents of the car at the commencement of the opening movement.

12. In a car, the combination with a body and its floor doors, of transverse pockets, means pivoted in said pockets supporting the doors for lateral movement, said means including toggle mechanism connected at the outer edges of the doors arranged to force the doors away from the contents of the car prior to lateral movement, and door operating means connected thereto through said toggle mechanism.

In witness whereof, I have hereunto set my hand in the presence of two witnesses.

ALLISON R. CHAMBERS.

Witnesses:
 FLORENCE EWING,
 ELSIE TAYLOR.

Copies of this patent may be obtained for five cents each, by addressing the "Commissioner of Patents, Washington, D. C."